No. 647,233. Patented Apr. 10, 1900.
J. P. LYON.
SELF SEALING JAR.
(Application filed Feb. 9, 1899.)
(No Model.)
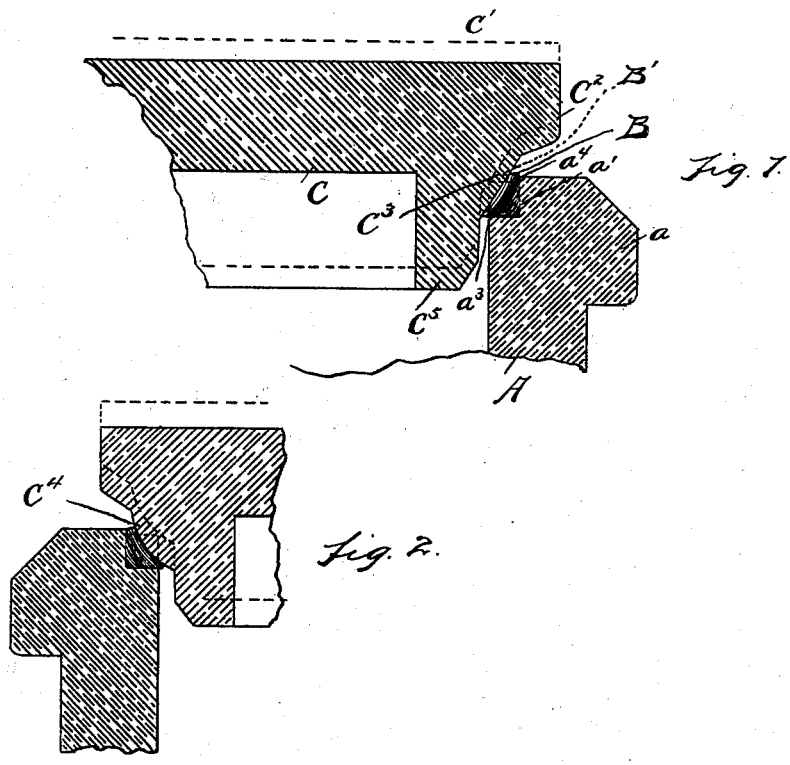

UNITED STATES PATENT OFFICE.

JULIAN P. LYON, OF DETROIT, MICHIGAN.

SELF-SEALING JAR.

SPECIFICATION forming part of Letters Patent No. 647,233, dated April 10, 1900.

Application filed February 9, 1899. Serial No. 705,072. (No model.)

*To all whom it may concern:*

Be it known that I, JULIAN P. LYON, a citizen of the United States, residing at Detroit, county of Wayne, State of Michigan, have invented a certain new and useful Improvement in Self-Sealing Jars; and I declare the following to be full, clear, and exact description of the invention, such as will enable others skilled in the art to which it pertains to make and use the same, reference being had to the accompanying drawings, which form a part of this specification.

My invention relates to the sealing of jars and bottles, and has for one object the reliable and certain sealing of the jars ordinarily made by the glass-maker and which are liable to be affected by certain defects due to the mode of manufacture.

A further object is to effect a saving in the sealing material; and the invention consists in the employment of a gasket of a peculiar form, in combination with a peculiarly-formed jar and cover constructed as hereinafter described and claimed.

In the manufacture of bottles and jars adapted for sealing it is found cheaper to make them by machinery, and it is well known that in articles so made of glass the exposed angles and edges, including the usual sealing-surfaces, are more or less cracked or "crizzled," as it is termed, so much so that they cannot be sealed in the ordinary manner, and therefore a large percentage of sealed jars made in this way fail, resulting in great loss, as these defects cannot readily be perceived by the eye. A further defect in "machine-made" glass jars is warping, and although this may be slight as it exists in both jar and cover it is obvious that it may seriously affect the sealing, as the mouth of the jar especially is liable to be warped more or less from the true circle and the warped cover is not likely to fit upon it.

I have discovered that by combining a gasket with jars and covers which are peculiarly formed in relation to each other and to the gasket these defects in machine-made jars and bottles can be practically overcome and also save quite a percentage of the material used in gaskets by making them smaller and lighter than those usually heretofore employed. I do this by so fashioning the jar and the cover that the cracking or crizzling does not take place on the line of the sealing-surface, and, further, by peculiarly forming the gasket and sealing-surface I enforce a compression of the gasket upon both jar and cover along the line which is free from defects and in such a way that the irregularities due to warping are accommodated. In the drawings I have shown forms which are adapted to secure these results upon this principle.

In the drawings, Figure 1 is a cross-section, enlarged, of one side of the mouth of a jar and one side of the cap and of the interposed gasket, illustrating its compressed sealed position. Fig. 2 is a similar figure illustrating the same with a slight modification of form in the cap.

In the drawings, A represents a partial sectional view of the upper portion or mouth of a jar or bottle.

B illustrates a cross-section of the gasket compressed.

B' illustrates an uncompressed cross-section of the gasket. (Shown in dotted lines.)

C is a cross-sectional view of a portion of the cover when in the sealing position compressing the gasket. C' is a cover in position before the gasket is compressed, as illustrated by the dotted lines.

The mouth of the jar is usually formed with an angular flange $a$ and has an angular rabbet $a'$, formed with substantially a reëntering right angle. An elastic gasket B, of a normal substantially-square cross-section, is adapted to be inserted in the rabbet and is so proportioned thereto that it substantially comes flush with the inner face of the jar and very nearly flush with the top of the jar, thus nearly filling the rabbet.

The cap C has edges formed with an angular flange $C^2$ and an angular depression $C^3$ intermediate thereto, which is constructed in the form of a frustum of a cone, thereby having an annular angular surface of about forty or forty-five degrees from the perpendicular, the diameter of which is adapted to bring this surface into contact with the exposed edge of the gasket at about the center of the surface.

The lower depending portion $C^5$ has a slightly-less diameter than the mouth of the jar, sufficiently so to allow for and accommodate the warping of the jar, and it also operates as a guide in entering the cap at the mouth.

The construction shown in Fig. 2 is exactly like that in Fig. 1, with the single exception that the contact-surface of the cover with the gasket instead of being a plain frustum of a cone is shown to be arranged in cross-section and somewhat raised, as a bead, but it follows the same principle of being at an angle of about forty or forty-five degrees of a perpendicular and has the same mode of operation upon the gasket. This curved contact-surface is marked $C^4$.

It will be noticed that I place the gasket in the reëntering angle between the inner surface of the jar at $a^3$ and the exposed surface of the jar $a^4$. If the mouth of the jar cracks or crizzles, it is the projecting angles and surfaces which crizzle. The reëntering angle $a'$ does not crizzle.

It will be noticed that the cap has a gasket in contact with a circumferential zone between two surfaces and projecting angles $C^2$ and $C^5$, and as the crizzling is liable to take place along these external angles, forming fissures in them, the intermediate surface, which is in contact with them, remains sound, and thus the gaskets in all cases are compressed between two sound surfaces. By making the bearing-surface of the diameter angular the compression of the cap upon the gasket is diagonal, forcing it directly into the reëntering angle of the rabbet, and this action is entirely unrestricted by the contact of any other surfaces when the cap is in the sealing position. The gasket is therefore forced closely and solidly into that portion of the jar which is free from defects by the unrestricted diagonal action of the cap thereon, and it is this principle of an unrestricted diagonal compression upon the substantially-square gasket into the substantially right-angle rabbet which constitutes my invention.

It is obvious that the parts might be reversed and produce the same effect, although the mode of assemblage would not be quite so convenient.

What I claim is—

1. The combination in a jar-closure of a circumferential rabbet provided with two surfaces at substantially right angles to each other, a gasket having a substantially-square cross-section and seated in said rabbet, a cap having an annular depending surface adapted to enter the mouth of the jar, an angular external surface extending beyond and of greater diameter than the mouth of the jar, and an angular surface joining the two, which angular surface is substantially forty-five degrees from the horizontal plane of the cap, and adapted to impinge upon and compress the gasket by unrestricted diagonal pressure into the angular right-angled rabbet, substantially as set forth.

2. The combination in a jar-closure of a circumferential rabbet provided with two surfaces at substantially right angles to each other, a gasket having a substantially-square cross-section seated in said rabbet, a third surface upon an opposite member at substantially forty-five degrees from the first two surfaces, and the fourth surface joined to said third surface, so inclined to said third surface as to avoid contact between the two members when the closure is in place, whereby the gasket will be diagonally forced into the reëntering angle of said rabbet by an unrestricted diagonal pressure, substantially as set forth.

In testimony whereof I sign this specification in the presence of two witnesses.

JULIAN P. LYON.

Witnesses:
R. A. PARKER,
MARION A. REEVE.